United States Patent
Horzella et al.

(10) Patent No.: US 10,991,929 B2
(45) Date of Patent: Apr. 27, 2021

(54) STRAIN RELIEF FOR FLEX FOIL

(71) Applicant: Gentherm Incorporated, Northville, MI (US)

(72) Inventors: Jan Horzella, Balgheim (DE); Timothy Hughes, South Lyon, MI (US)

(73) Assignee: Gentherm Inc., Northville, MI (US)

( * ) Notice: Subject to any disclaimer, the term of this patent is extended or adjusted under 35 U.S.C. 154(b) by 24 days.

(21) Appl. No.: 16/531,363

(22) Filed: Aug. 5, 2019

(65) Prior Publication Data
US 2021/0043906 A1 Feb. 11, 2021

(51) Int. Cl.
| | |
|---|---|
| H05K 1/00 | (2006.01) |
| H01M 2/20 | (2006.01) |
| H01R 11/09 | (2006.01) |
| H01R 4/02 | (2006.01) |
| H01R 4/04 | (2006.01) |
| H01R 11/01 | (2006.01) |

(52) U.S. Cl.
CPC ............ *H01M 2/206* (2013.01); *H01R 4/029* (2013.01); *H01R 4/04* (2013.01); *H01R 11/01* (2013.01); *H01R 11/09* (2013.01); *H01M 2220/20* (2013.01)

(58) Field of Classification Search
USPC ......................................................... 361/749
See application file for complete search history.

(56) References Cited

U.S. PATENT DOCUMENTS

| | | | |
|---|---|---|---|
| 7,919,027 B2 | 4/2011 | Nordlinder et al. | |
| 2016/0073506 A1* | 3/2016 | Coakley | H05K 1/189 156/60 |
| 2016/0172647 A1 | 6/2016 | Okiga | |
| 2019/0088918 A1 | 3/2019 | Goh et al. | |

FOREIGN PATENT DOCUMENTS

WO    WO-2005/027599 A1    3/2005

OTHER PUBLICATIONS

International Search Report and Written Opinion dated Oct. 28, 2020 corresponding to International Application No. PCT/US2020/044140, 11 pages.

* cited by examiner

*Primary Examiner* — Andargie M Aychillhum

(57) ABSTRACT

A battery connection assembly includes a frame including a plurality of posts that are spaced by a first distance. A flex foil includes a conductive layer and first and second insulating layers arranged adjacent to the conductive layer. A first plurality of traces is defined in the conductive layer. A plurality of fingers is defined in the conductive layer and partially released from the flex foil, wherein the first insulating layer is removed from the plurality of fingers to expose the conductive layer. A plurality of busbars is connected to the frame and including a first surface, a second surface and a hole from the first surface to the second surface. The plurality of fingers is attached to the first surfaces of the busbar at an attachment location and wherein adhesive in the hole attaches the flex foil to the busbar adjacent to the attachment location.

10 Claims, 5 Drawing Sheets

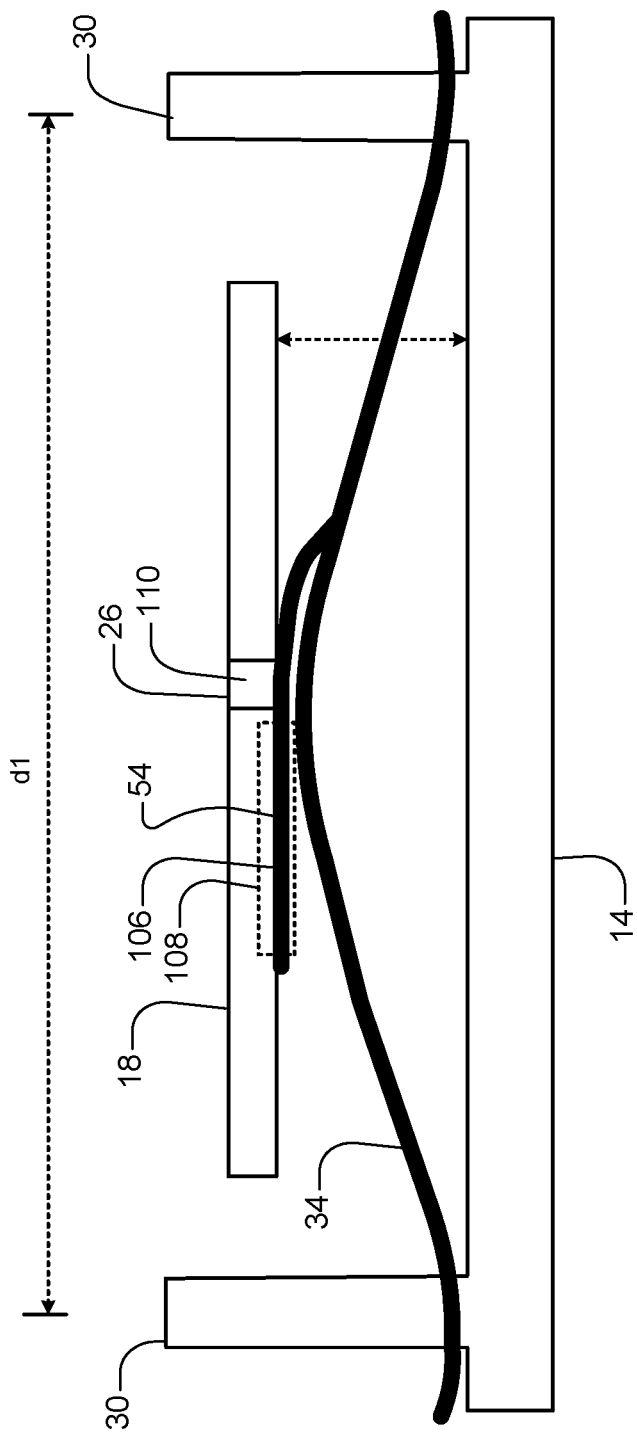
FIG. 3
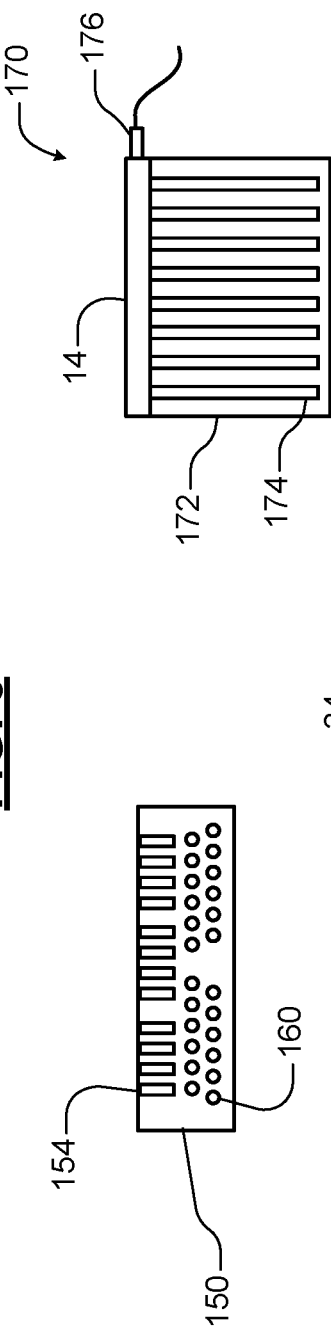
FIG. 4A
FIG. 4B
FIG. 5

STRAIN RELIEF FOR FLEX FOIL

FIELD

The present disclosure relates to electrical connectors and more particularly to electrical connectors for battery systems.

BACKGROUND

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

Hybrid vehicles include an internal combustion engine (ICE), an electric motor, and a battery system. Depending on the situation, the ICE, the electric motor or both can be used to drive the vehicle. Pure electric vehicles include an electric motor and a battery system and do not include an ICE. The battery systems in hybrid and electric vehicles generally have a higher storage capacity than convention vehicles that are solely propelled by an ICE.

To provide higher storage capacity, the battery systems include one or more batteries that are connected together. Each of the batteries, in turn, include one or more battery cells. More sophisticated control and monitoring techniques are used to control the battery system. For example, during operation, additional battery parameters such as current, temperature and charge state are monitored. As a result, multiple connections are made to each battery cell. Operation of the battery system is adjusted based on the monitored parameters.

SUMMARY

A battery connection assembly includes a frame including a plurality of posts that are spaced by a first distance. A flex foil includes a conductive layer and first and second insulating layers arranged adjacent to the conductive layer. Aa first plurality of traces is defined in the conductive layer. A plurality of fingers is defined in the conductive layer and partially released from the flex foil, wherein the first insulating layer is removed from the plurality of fingers to expose the conductive layer. A plurality of busbars is connected to the frame and including a first surface, a second surface and a hole from the first surface to the second surface. The plurality of fingers is attached to the first surfaces of the busbar at an attachment location and wherein adhesive in the hole attaches the flex foil to the busbar adjacent to the attachment location.

In other features, the finger is ultrasonically welded to the first surface of the busbar. A plurality of holes in the flex foil that is spaced by a second distance. The holes of the flex foil are received by the posts and the flex foil is arranged between the busbar and the frame. The second distance is greater than the first distance.

In other features, selected ones of the first plurality of traces are connected to the fingers.

The plurality of traces and the fingers are defined using dry milling. The conductive layer has a thickness in a range from 5 μm to 40 μm. A printed circuit board is connected to the flex foil and including a second plurality of traces connected to the first plurality of traces. The printed circuit board is attached to the flex foil using adhesive.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIG. 3 is a side view of an example of the flex foil connected to the bus bar according to the present disclosure;

FIG. 4A is a plan view of an example of a printed circuit board according to the present disclosure;

FIG. 4B is a side view illustrating an example of the printed circuit board connected to the flex foil using conductive adhesive;

FIG. 5 is a simplified drawing of a battery system including battery cells and a battery enclosure according to the present disclosure.

In the drawings, reference numbers may be reused to identify similar and/or identical elements.

DETAILED DESCRIPTION

A battery connector assembly according to the present disclosure includes a frame, a flexible substrate including a conductive layer and outer insulating layers (referred to herein as flexible foil or flex foil), and cell connectors or busbars. In some examples, connections to the busbars are provided to sense battery cell parameters or for cell charge balancing, although connections can be made to the busbars for other reasons.

The battery connector assembly provides stress relief and reliable connections to battery cell connectors such as busbars. While the foregoing description involves vehicle applications, the battery connector assembly according to the present disclosure can be used for other applications.

Fingers of the flex foil are cut to allow connections to one side of a battery cell connector such as a busbar. The connections should be able to withstand the weight of the flex foil and relative motion between the flex foil and the busbar. The relative motion can be caused by a number of external influences such as assembly tolerance accumulation, vibration, mechanical shock, and/or differences in coefficients of thermal expansion (CTEs) for different materials. For example, the busbars may expand by about 3% during operation.

In some examples, the conductive material on the flex foil is relatively thin (e.g. the thickness is less than conductive traces used in prior designs). Flex foil has been used with thicker copper (Cu) traces having a thickness of at least 100 μm. In some examples, the conductive traces according to the present disclosure have a thickness in a range from 5 μm to 40 μm, although thicker or thinner traces can be used. In some examples, the conductive traces are made of metal such as aluminum (Al) or copper (Cu).

In the battery connector assembly according to the present disclosure, the flex foil is located beneath the busbars and is then electrically connected to the busbars. However, the weight of the flex foil pulls on the electrical connection during operation. This repeated stress reduces the reliability of the electrical connection over time. Another problem is that it is not possible to apply adhesive on the same side as the electrical connection without damaging the connection since the connection is between the frame and the busbars. To address this problem, the busbar according to the present disclosure includes a hole or window on the busbars that is located near the attachment location of the flex foil to the busbar. Adhesive is dispensed into the hole to attach the flex foil to the busbar adjacent to the electrical connection to the busbar to provide strain relief (e.g. reduce strain on the electrical connection).

As can be appreciated, the electrical connection of the flex foil to the busbar is located on one side and the adhesive is dispensed from the opposite side of the busbar. This approach simplifies manufacturing of the battery connector assembly while improving reliability.

Figure 1:
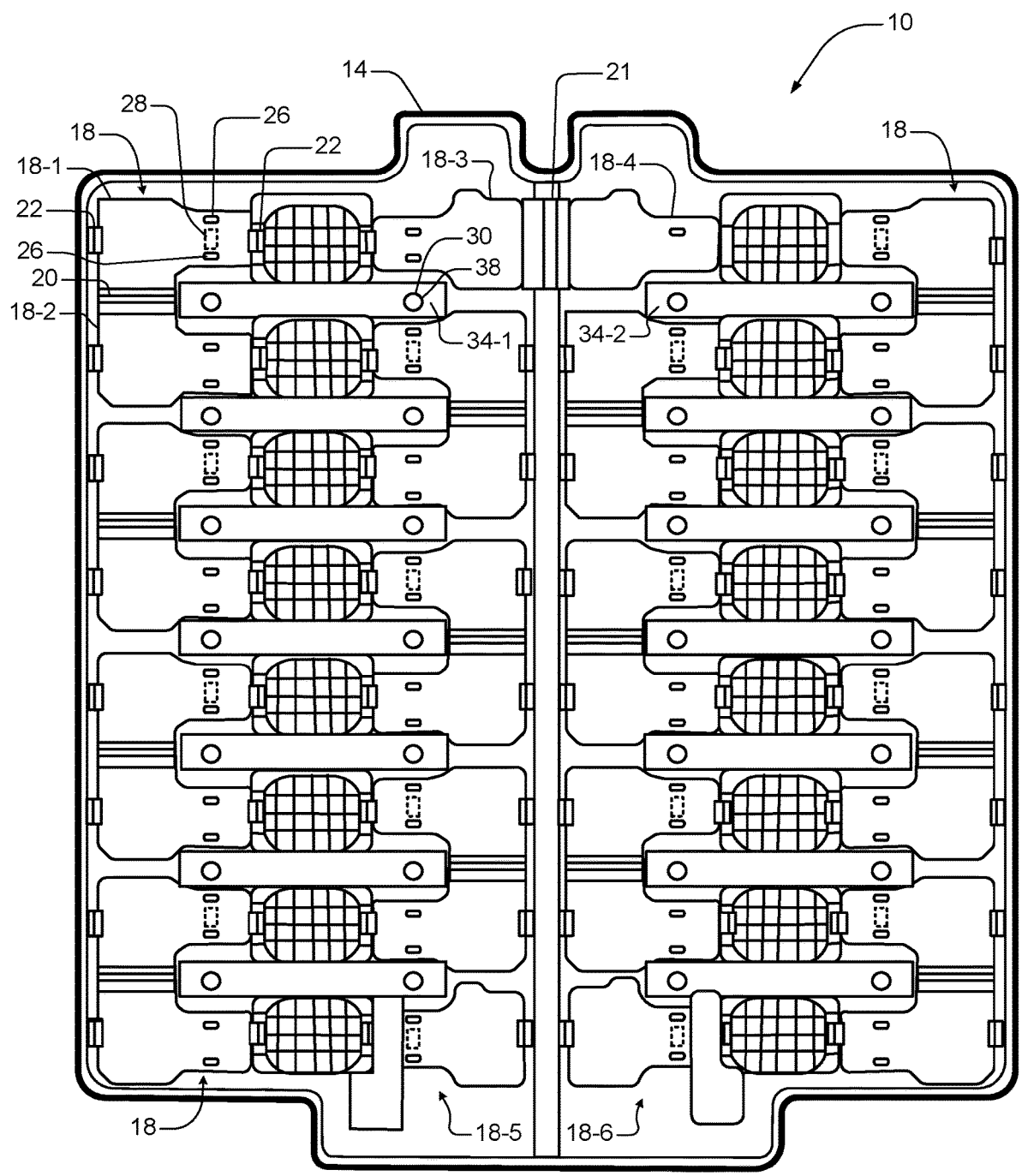
FIG. 1 is a plan view of an example of a battery connector assembly including a frame, busbars and flex foil according to the present disclosure.

Referring now to FIG. 1, a battery connector assembly 10 for a battery system is shown. In some examples, the battery system includes two rows of battery cells. In some examples, the rows of battery cells include 8 battery cells that are connected in series to the busbars and the rows of battery cells are also connected together in series to positive and negative battery terminals. As can be appreciated, the battery system described herein is for illustration purposes only and may include other arrangements, numbers of cells, parallel and/or serial connections of the battery cells, etc.

The battery connector assembly 10 includes a frame 14, a plurality of busbars 18 attached to the frame 10, a first flex foil 34-1, and a second flex foil 34-2 (both may be generically identified as flex foil 34).

In some examples, the busbars 18 may be connected side-by-side with an expansion portion 20 located therebetween as shown at 18-1 and 18-2. The expansion portion 20 may include metal that is bent or curved to allow relative movement. In other examples, the busbars 18 may be connected end-to-end with an expansion portion 21 located therebetween as shown at 18-3 and 18-4. In some examples, the busbars 18 include individual or single busbars as shown at 18-5 and 18-6.

Each of the busbars 18 includes one or more holes 26 passing therethrough from one surface thereof to an opposing surface thereof. An opposing surface of the busbars 18 is attached to the flex foil 34 at corresponding attachment locations 28. In some examples, the flex foil 34 is attached using ultrasonic welding. The one or more holes 26 are arranged adjacent to the attachment locations 28. As will be described further below, adhesive is applied in selected ones of the holes 26 to attach the flex foil 34 to the busbars 18 after the flex foil 34 is attached at the attachment locations 28. The adhesive provides strain relief for the attachment locations 28.

The frame 14 may include flexible tabs 22 to allow the busbars 18 to be snap-fit into the frame 14, retained and released if needed. In some examples, the flexible tabs 22 are located along opposing sides of the frame 14. Additional flexible tabs 22 are arranged in first and second rows adjacent to a center portion of the frame 14. The frame 14 generally extends in a first plane and includes first and second rows of posts 30. The posts 30 in each of the first and second rows are spaced apart by a distance d1 (shown in FIG. 3). The posts 30 extend from the frame 14 in a direction that is transverse to the first plane.

The flex foil 34 includes spaced holes 38 that receive the posts 30. The spaced holes 38 in the flex foil 34 are spaced by a distance d2 (shown in FIG. 2A) that is greater than d1. The difference in distances d1 and d2 may be used to reduce strain on the electrical connections, as will be described further below.

Figure 2A:
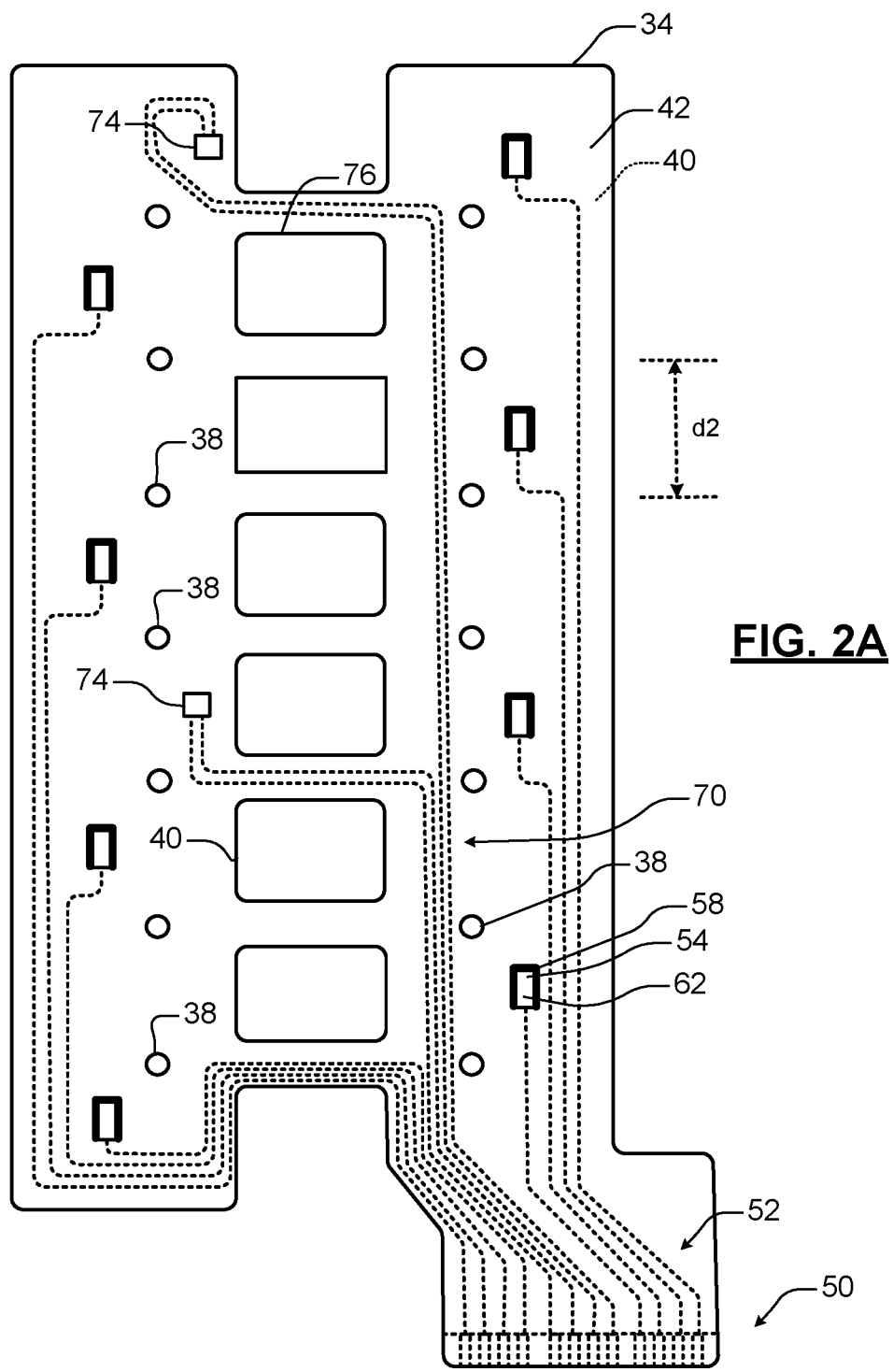
FIG. 2A is a plan view of an example of the flex foil according to the present disclosure.
Figure 2B:
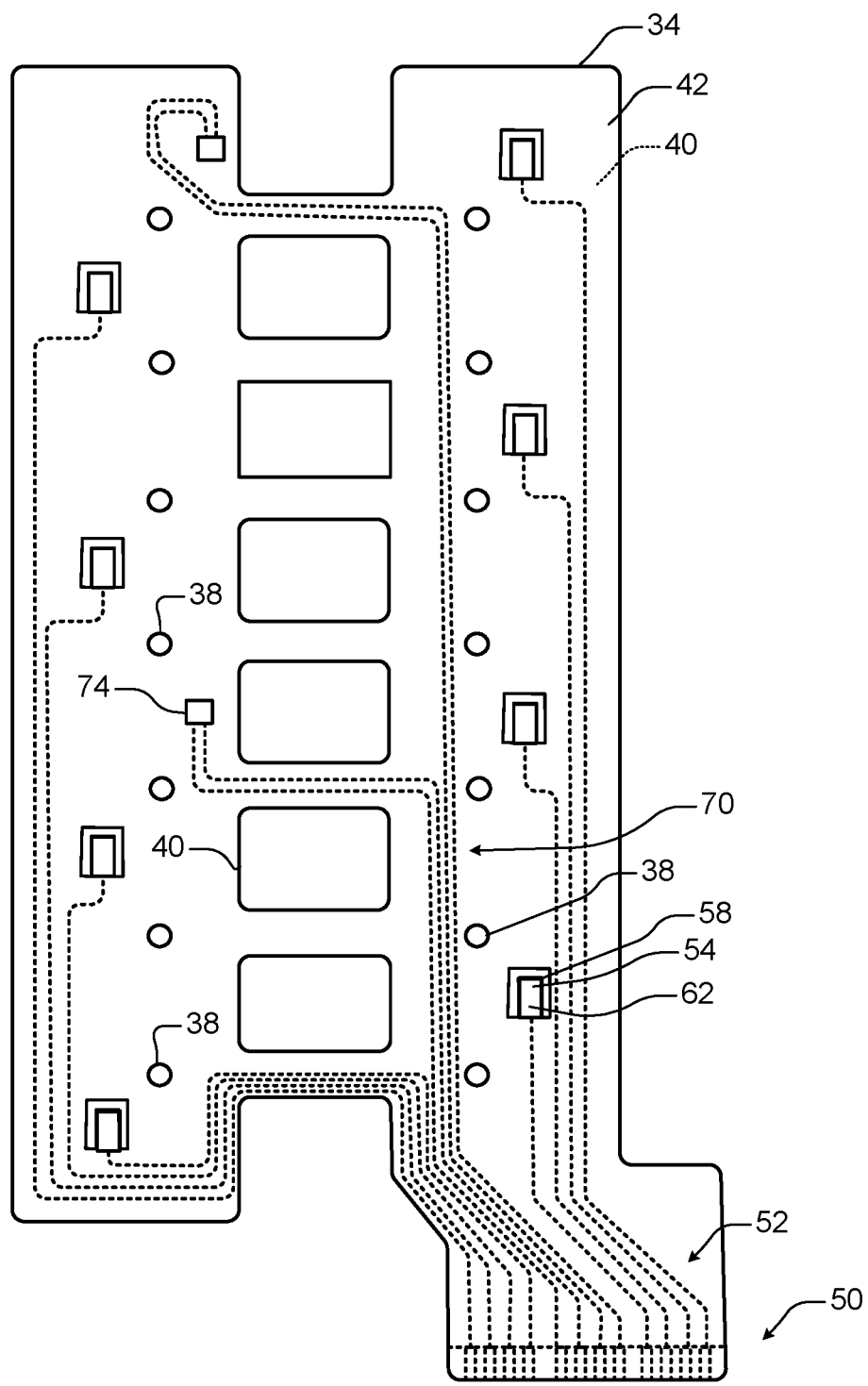
FIG. 2B is a plan view of another example of the flex foil according to the present disclosure.

Referring now to FIGS. 2A and 2B, examples of the flex foil 34 are shown. The flex foil 34 includes a conductive layer 40 and insulating layers 42 on one or both sides of the conductive layer 40. In some examples, the conductive layer 40 is made of metal such as Al or Cu and has a thickness in a range from 5 μm to 40 μm, although thicker and thinner traces can be used. In some examples, Cu having a thickness of 9 μm, 18 μm, or 35 μm, or Al having a thickness of 9 μm or 18 μm may be used. In some examples, the insulating layers 42 include film such as polyethylene terephthalate (PET), polyethylene naphthalate (PEN), or polyimide (PI), although other materials can be used.

In some locations, portions of the conducting layer 40 and/or the insulating layer 42 on one side are removed using a dry milling process. A suitable example of a dry milling process is shown and described in U.S. Pat. No. 7,919,027, issued on Apr. 5, 2011 and entitled "Methods and Devices for Manufacturing of Electrical Components and Laminated Structures", which is hereby incorporated herein by reference in its entirety. During dry milling, a web of the flex foil is fed between a milling wheel and a cliché.

The cliché includes a rotating drum and a flexible substrate with a pattern including raised portions and non-raised portions. The substrate is attached to the drum. In some examples, the pattern is made using photolithography. The milling wheel is arranged on an opposite side of the web. The raised portions of the pattern on the cliché push the conductive layer into the milling wheel and the corresponding portions of the conductive layer are removed. A similar approach can be used to mill the insulating layer. The conductive layer that remains is thereby patterned to provide traces, pads for fingers, etc. and intervening areas where the conductive layer is absent. After milling the conductive layer, an insulating or coverlay layer can be arranged over the conductive layer. An additional milling step may be used to expose portions of the traces.

The flex foil 34 includes a connection location 50 and traces 52 that extend from the connection location 50 to other locations of the flex foil 34. The insulating layer 42 is removed from one side of the conductive layer 40 at the connection location 50 to allow external connection to the traces. A plurality of fingers 54 are kiss cut in the flex foil 34 and the insulating layer 42 is removed from the plurality of fingers 54 as indicated at 62. Edges of the plurality of fingers 54 are cut at 58 to release a portion of the plurality of fingers 54 from the flex foil 34 to allow attachment to the busbars 18 by ultrasonic welding and adhesive. In FIG. 2A, the plurality of fingers 54 have a rectangular shape and the cut has a "U"-shaped to release three edges of the plurality of fingers 54. However, other shapes can be used. In FIG. 2B, the cut 58' may be used to remove material of the flex foil 34 around the "U"-shaped cut to provide clearance.

In some examples, a first group of the traces 52 extend to the plurality of fingers 54 located along one side of the flex foil 34. A second group of the traces 52 extend to the plurality of fingers 54 located along another side of the flex foil 34. A third group of traces (at 70) extend to first and second locations. In some examples, a temperature sensor 74 or other type of sensor may be arranged at these locations.

The flex foil 34 may also include spaced holes 76 to allow airflow through the frame 14 and the flex foil 34.

Referring now to FIG. 3, the flex foil 34 is shown connected to the busbar 18. Due to the difference in the distance d1 between posts and the difference d2 between the holes 38 in the flex foil 34, the flex foil 34 is curved (to reduce strain) and lies adjacent to a surface 106 of the busbar 18. One of the plurality of fingers 54 is ultrasonically welded in a region 108 of the busbar 18. One of the holes 26 in the busbar 18 is located adjacent to the region 108. Adhesive 110 may be delivered through the hole 26 to bond the finger 54 to the surface 106 of the busbar 18.

Referring now to FIGS. 4A and 4B, external connection to the flex foil is shown. In FIG. 4A, a printed circuit board 150 is shown. In FIG. 4B, the printed circuit board 150 is shown attached to the flex foil 34. The printed circuit board 150 includes traces 154 that align with the traces 52 at the connection location 50. Adhesive 164 is applied between an end of the flex foil 34 including the connection location 50 and the printed circuit board 150 (with the traces 154 and 52 aligned). In some example, the adhesive 164 conducts in one direction (corresponding to a direction of applied pressure) and includes epoxy resin. In some examples, Delo® Monopox heat-curing adhesive is used. Heat and pressure in a direction transverse to the printed circuit board 150 is applied for a predetermined period to cure the adhesive. The printed circuit board 150 may include plated vias 160 to provide external connections.

Referring now to FIG. 5, a battery system 170 includes a battery enclosure 172 enclosing a plurality of battery cells 174. The frame 14 includes the busbars 18 (not shown in FIG. 5) that are attached to the plurality of battery cells 174 in the battery enclosure 172. A connector 176 provides a connection to the battery system 170 for parameter sensing components and/or for cell balancing (described above). Terminal connections (not shown) are also connected to the battery system 170.

Figure 6:
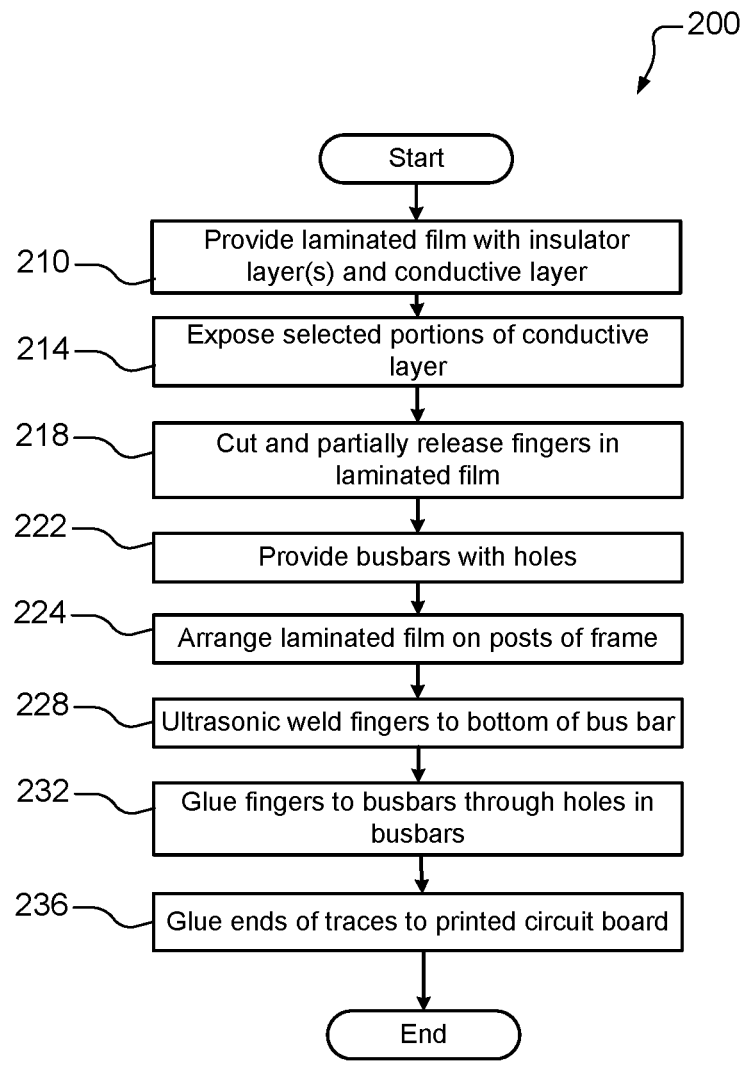
FIG. 6 is a flowchart of an example of a method for assembling the frame, busbars and flex foil according to the present disclosure.

Referring now to FIG. 6, a method 200 for manufacturing and assembling the frame, busbars and flex foil is shown. As can be appreciated, the order of one or more steps of the method can be changed. At 210, the flex foil with one or more insulator layers and a conductive layer is provided. The conductive layer and/or the insulating layer are patterned using dry milling as described above. At 214, portions of the conductive layer or the insulating layer are milled. At 218, fingers are cut in the flex foil to partially release the fingers. In some examples, a die is used. At 222, busbars with holes are provided.

At 224, the flex foil is arranged on posts of the frame. At 228, the fingers are connected (e.g. ultrasonically welded) to the busbars. As can be appreciated, the order of steps 224 and 228 can be reversed. At 232, the fingers are glued to the busbars adjacent to the ultrasonic weld locations using adhesive applied through the holes in the busbars. At 236, ends of the traces of the flex foil are glued to the traces of the printed circuit board. The frame can then be arranged on a battery enclosure including the battery cells.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

What is claimed is:

1. A battery connector assembly comprising:
    a frame including a plurality of posts that are spaced by a first distance;
    a flex foil including:
        a conductive layer;
        first and second insulating layers arranged adjacent to the conductive layer;
        a first plurality of traces defined in the conductive layer; and
        a plurality of fingers defined in the conductive layer, wherein the fingers are partially released from the flex foil and are uninsulated; and
    a plurality of busbars connected to the frame and including a first surface, a second surface and a hole from the first surface to the second surface,
    wherein the plurality of fingers is attached to the first surfaces of the busbar at an attachment location and wherein adhesive in the hole attaches the flex foil to the busbar adjacent to the attachment location.

2. The battery connector assembly of claim 1, wherein the finger is ultrasonically welded to the first surface of the busbar.

3. The battery connector assembly of claim 1, further comprising a plurality of holes in the flex foil that are spaced by a second distance.

4. The battery connector assembly of claim 3, wherein the second distance is greater than the first distance.

5. The battery connector assembly of claim 4, further comprising a printed circuit board connected to the flex foil and including a second plurality of traces connected to the first plurality of traces.

6. The battery connector assembly of claim 5, wherein the printed circuit board is attached to the flex foil using adhesive.

7. The battery connector assembly of claim 1, wherein the holes of the flex foil are received by the posts and the flex foil is arranged between the busbar and the frame.

8. The battery connector assembly of claim 1, wherein selected ones of the first plurality of traces are connected to the fingers.

9. The battery connector assembly of claim 1, wherein the plurality of traces and the fingers are defined using dry milling.

10. The battery connector assembly of claim 1, wherein the conductive layer has a thickness in a range from 5 μm to 40 μm.

* * * * *